Inventor:
DONALD I. CRAFT
By Robert J. Goldberg
His Attorney

3,422,669
FILM STRETCHING DEVICE
Donald I. Craft, Pittsfield, Mass., assignor to General
Electric Company, a corporation of New York
Filed June 8, 1966, Ser. No. 564,459
U.S. Cl. 73—102                                                2 Claims
Int. Cl. G01n 3/28, 3/08

ABSTRACT OF THE DISCLOSURE

Apparatus for radial stretching of plastic films having concentric rings, the inner ring carrying roller pulleys engaging the outer ring. Trained over each roller pulley is a cable attached at one end to the centrally arranged plastic film and at the other end to the outer ring. Relative rotation of the rings causes the cables to be drawn around said pulleys to omnidirectionally stretch the film. Another cable secured to the outer ring is trained over a pulley fixed with relation to the inner ring. Tensioning of this cable causes the rings to rotate relative to one another.

---

Figure 1:
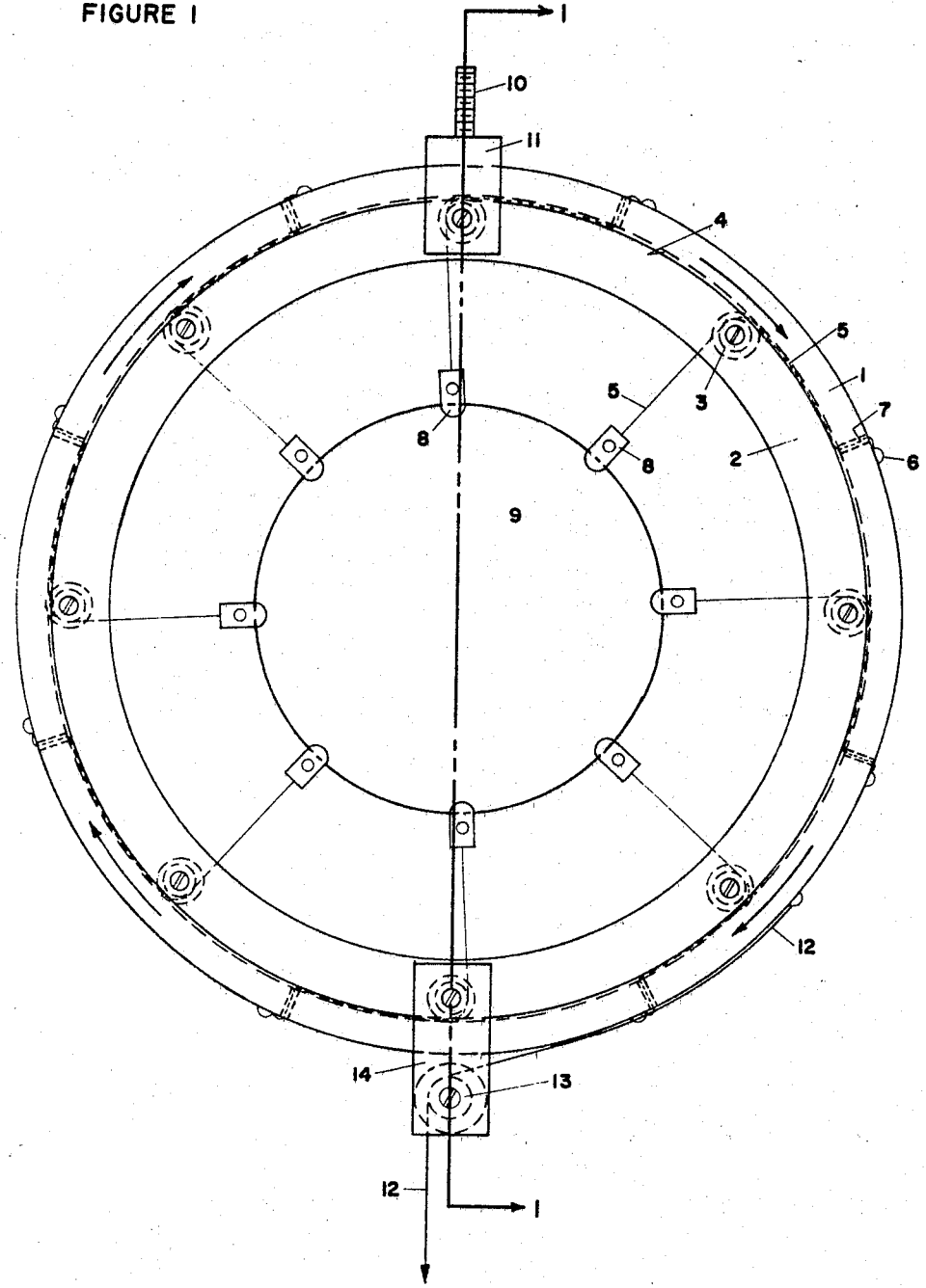

This invention relates to a device for stretching plastic film. More particularly, this invention relates to a device for simultaneously drawing and stretching a plastic film so that the film is capable of substantially equal elongation in all directions in the plane of the film while a unidirectional force is exerted on the stretching device. In addition, the invention is directed to a device for stretching plastic film that is low in cost and useful for laboratory evaluations.

Plastic films, such as are used for wrapping or packaging purposes are made most commonly by extruding the plastic in molten form as a sheet and stretching the extruded sheet to reduce its thickness and to orient the molecules parallel to the major plane of the resulting film. The evaluation of a new plastic and the determination of optimum stretching conditions such as stretch ratio and temperature normally requires a considerable research effort involving expensive laboratory equipment. In general, most plastic film are equally yieldable, or equally resistant to stress in all directions in their major plane. Therefore, it has been a long-standing objective to devise a flexible, inexpensive piece of laboratory equipment capable of effecting equal and omnidirectional stretching during the testing and evaluation of plastic film. Heretofore, tenters, moving along divergent paths, have been used to stretch flat plastic sheets both longitudinally and transversely, but these have many manipulative problems and have met with little acceptance. Even the best of methods presents difficulties in achieving a truly uniform stretching in all directions, and the films produced are not uniform in all directions as is desired.

It is a principal object of this invention to provide an apparatus for evaluating plastic film which exhibits substantially equal evidence of orientation in all directions in the plane of the film. A particular object of this invention is to provide an inexpensive apparatus useful for laboratory evaluation of plastic film that is capable of effecting a ominidirectional stretch in one continuous operation while exerting a unidirectional force on the stretching apparatus; the film so stretched exhibiting substantially uniform orientation in all directions. Other objects and advantages of this invention will be in part apparent and in part pointed out in the description which follows.

In general, the apparatus of this invention comprises two concentric rings in slideable contact with each other and in combination with a plurality of roller pulleys and cables extending radially toward the center of a circle formed by the concentric rings. In operation, the cables are attached to a circular film sample located within the circle formed by the two concentric rings. A unilateral force is exerted on the device which causes the two concentric rings to rotate relative to each other. This, in turn, causes a force to be exerted on each cable drawing the cable away from the center of the circle formed by the rings with a resultant omnidirectional stretch applied to the film.

Figure 2:
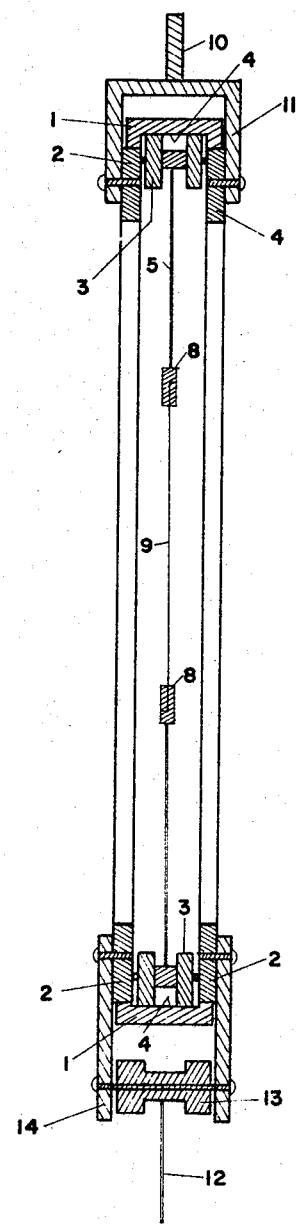

The invention will be better understood by reference to the accompanying drawings wherein FIGURE 1 represents a plane view of the apparatus of this invention and FIGURE 2 represents a cross-sectional view of the apparatus taken along the lines 1—1 of FIGURE 1. In the drawings, like parts have like numerical designation.

The apparatus includes a rotatable outer ring 1 and a fixed inner ring 2 so arranged that the two rings are in slideable relation with each other. The inner ring 2 is hollow and provides a channel in open communication with a raceway 4 contained on the inner surface of outer ring 1. A plurality of roller pulleys 3 are disposed within the channel of inner ring 2 and are in rotating contact with raceway 4 of outer ring 1. A cable 5 is associated with each roller pulley 3. Each cable is secured to a point 6 on the outer ring, preferably on its outer surface, by any suitable means such as by soldering, bolting etc. The cable 5 passes through a hole 7 in outer ring 1, along raceway 4, over roller pulley 3, and thereafter extends radially towards the center of the circle formed by the rings. A clamp 8 is associated with the end of each cable. The clamp is used to grip a circular sample plastic film 9 placed in the center of the circle formed by the concentric rings. Tenter clamps well known in the art are preferred for this purpose, but any of the gripping means commonly used for stretching plastic film would be suitable.

The supporting framework (not shown) for the stretching apparatus is of relatively simple design. The apparatus is preferably placed in a vertical plane. It may be secured at its top by means of bolt 10 and bracket 11. The bracket is secured to inner ring 2 in a manner so as not to interfere with the rotation of the two concentric rings relative to each other (better illustrated in FIGURE 2). The stretching apparatus is secured at its lower end by cable 12. Cable 12 is secured to the outer ring 1 and passes over pulley 13. Pulley 13 is secured in position by bracket 14 which, in turn, is secured to inner ring 2, (better illustrated in FIGURE 2) in a manner so as not to interfere with the rotation of the two concentric rings relative to each other.

To operate the film stretching apparatus, it is secured at the top, preferably in a vertical plane, using threaded member 10. Any support means may be used for the assembly, though, for ease of operation, it is desirable that the apparatus be secured in one jaw of a gripping device such as a tensile testing apparatus normally found in most laboratories. For most film stretching operations, it is desirable to first heat the film to its softening point. This may readily be accomplished by mounting the entire assembly in a furnace. Clamps 8 are pulled radially toward the center of the circle formed by the concentric rings and attached to the periphery of a circular plastic film sample 9. A downward force is exerted on cable 12. This force may be exerted simply by attaching weights to the cable. Preferably, the force is exerted evenly and slowly by using a tensile machine with movable jaws. Thus, the force is exerted by separating the jaws at a desired rate. The force exerted on cable 12 causes the cable to move downward which results in a clockwise rotation of outer ring 1. Cables 5 are attached to outer ring 1 and the rotation of the ring causes the cables to move radially away from the center of the circle formed by the rings. This, in turn, causes an omnidirectional force to be exerted on the plastic film. Thus, a unidirectional force exerted on the stretching apparatus is translated into an omnidirectional force exerted on the plastic film.

The invention is further illustrated by the following example which is set forth for purposes of illustration only and not by way of limitation.

EXAMPLE

The film stretching device illustrated in FIGURES 1 and 2 of the drawings was mounted in an Instron tensile testing apparatus. The bolt at the top of the device was secured to the upper jaw of the tensile testing apparatus. The cable at the bottom was secured to the lower movable jaw of the machine. The cables were pulled radially towards the center of the film stretching device and the clamps attached to the cables were used to secure a circular film sample of polyethylene having a diameter of two inches and a thickness of ten mils. The movable jaws of the Instron testing apparatus are enclosed within a heating chamber. The chamber was heated to the softening point of the polyethylene. Thereafter, a unidirectional force was exerted on the stretching device by lowering the bottom jaw of the Instron at a rate of approximately one inch per minute. The action was continued until the diameter of the plastic film sample reached six inches. The film sample was then removed from the stretching apparatus and was found to have a thickness of one mil.

The specific embodiment described herein is presented merely as an example of the form which this invention may take. Therefore, it is intended in the appended claims to cover all modifications and variations falling within the scope of this invention.

What I claim as new and desire to secure by Letters Patent of the United States is:

1. An apparatus for omnidirectional stretching of a heat-softened plastic film comprising in combination an outer circular ring and a hollow inner circular ring in slideable contact therewith, said inner circular ring so arranged as to provide a channel in open communication with the inner surface of the outer circular ring, a plurality of roller pulleys symmetrically disposed within the channel formed by said inner ring, each of said roller pulleys being in contact with the inner surface of the outer ring; a plurality of cables associated with said roller pulleys, each of said cables extending from a secured position on said outer ring, around a roller pulley and radially towards the center of a circle formed by said circular rings, each of said cables having a clamp on the end extending radially toward the center of the circle capable of grasping the edge of a plastic film sample, means for securing said inner circular ring to a support, and means for translating a unidirectional force applied to the stretching apparatus to a rotational force on said outer circular ring whereby said cables are radially pulled from the center of the circle formed by the rings thereby exerting an omnidirectional stretch to a heat-softened plastic film sample held in said stretching apparatus.

2. The stretching apparatus according to claim 1 whereby the means for translating the unidirectional force to the outer ring consists of a cable attached to said outer ring and a pulley associated therewith.

References Cited

UNITED STATES PATENTS 263,792  9/1882  Lindemann _____ 38—102.1

FOREIGN PATENTS 24,186  2/1883  Germany.
39,861  7/1886  Germany.

RICHARD C. QUEISSER, *Primary Examiner.*

JAMES H. WILLIAMSON, *Assistant Examiner.*

U.S. Cl. X.R.

38—102.1; 73—95